United States Patent [19]

Kurozumi et al.

[11] Patent Number: 5,013,956
[45] Date of Patent: May 7, 1991

[54] LINING MATERIAL AND ULTRASONIC WAVE DRIVEN MOTOR USING LINING MATERIAL

[75] Inventors: Seiji Kurozumi, Kadoma; Shigenori Uda, Osaka; Masatake Hirai, Katano; Katuhiro Murano, Ootu; Takeo Kimura; Nobuyuki Yamamoto, both of Ibaragi, all of Japan

[73] Assignees: Matsushita Electric Industrial Co., Ltd.; Teijin Limited, both of Osaka, Japan

[21] Appl. No.: 336,960

[22] Filed: Mar. 20, 1989

[63] Related U.S. Application Data Continuation of PCT JP88/00718 filed Jul. 19, 1988, published as WO89/00787 on Jan. 26, 1989.

[30] Foreign Application Priority Data

Jul. 21, 1987 [JP] Japan ................... 62-181542

[51] Int. Cl.$^5$ ........................... H01L 41/08
[52] U.S. Cl. ................................. 310/323
[58] Field of Search ................. 310/323, 328

[56] References Cited

U.S. PATENT DOCUMENTS

| 4,736,129 | 4/1988 | Endo et al. ............ 310/328 X |
| 4,739,212 | 4/1988 | Imasaka et al. ........ 310/328 X |

FOREIGN PATENT DOCUMENTS

| 0209865 | 1/1987 | European Pat. Off. ............ 310/323 |
| 0222394 | 5/1987 | European Pat. Off. ............ 310/323 |
| 0023379 | 1/1987 | Japan .................... 310/323 |
| 0114480 | 5/1987 | Japan .................... 310/323 |
| 0114481 | 5/1987 | Japan .................... 310/323 |
| 0147979 | 7/1987 | Japan .................... 310/323 |

Primary Examiner—Mark O. Budd
Attorney, Agent, or Firm—Wenderoth, Lind & Ponack

[57] ABSTRACT

A lining material superior in abrasion-proof, considerably reducing the sliding sounds to be caused at high speeds, and an ultrasonic wave driven motor using the lining material (9) for the inverted face of a rotor (2).

The lining material is composed of total aromatic polyamide pulp granule of a meta type and/or total aromatic polyamide fiber of a meta type as main comonents, being 3 through 40% in the percentage of voids. As the lining material (9) is used as the inverted face of the rotor portion (2) which comes into contact against the vibration amplifying portion (5) of the stator portion (1), so that the noises during the driving operation may be reduced, and also, the service life of the inverted face may be extended.

6 Claims, 1 Drawing Sheet

LINING MATERIAL AND ULTRASONIC WAVE DRIVEN MOTOR USING LINING MATERIAL

This application is a continuation of PCT/JP88/00718 filed 7/19/88.

BACKGROUND OF THE INVENTION

The present invention generally relates to a lining material, superior in abrasion-proof property, to be used in sliding portion. Or it relates, also, to an ultrasonic wave driven motor using the lining material in the sliding portion between a rotor and a stator.

A so-called ultrasonic wave driven motor is a piezo-electric member driven motor which uses piezo-electric member vibrations as an excitation portion to cause resonance in the solid by the vibration of the excitation portion so as to convert the vibration into rotation movements. The ultrasonic wave driven motor is characterized in the simplicity of the construction thereof. The wider application thereof is expected in electronic appliances, camera, appliances for medical treatment use and so on. As the ultrasonic wave driven motor converts the ultrasonic wave vibrations into rotating movements or the like, two types of mediums which come into contact against each other come into friction without fail in the converting portion from the vibration movements into the rotating movements or the like. There is proposed Japanese Laid-Open Patent Application Tokkaisho No. 60-200778 or the like that in the conventional ultrasonic wave driven motor, there are used metals, which are hard with abrasion-proof and tenacity therein, such as steel, hardened steel, tool steel; further non-ferrous metals, which are duralumin, titanium alloy, Monel metal, phosphor bronze, beryllium copper, tungsten, chronium, cobalt, and alloys thereof, as a stator portion for causing resonance by the excitation portion, while there are used metals, which are lower in hardens than metals used in the stator portion, such as copper, copper alloy, aluminum, aluminum alloy, zinc, zinc alloy, as a material of a rotor portion with respect to it, with a lining material made of rubber or phenol resin being disposed in the contact portion between the stator portion and the rotor portion. An ultrasonic wave driven motor of such a construction as described hereinabove has advantages in that the absorption factor of the ultrasonic wave vibrations is extremely small and the Q value of the resonance portion is higher within the range of the working frequency (approximately 20 KHz through 100 KHz.)

But such ultrasonic wave driven motor as described hereinabove has disadvantages in that the abrasion amount of the abrasion portion of the lining material is large, the service life is short, also larger noises are caused in the sliding portion when the lining material has been slid.

SUMMARY OF THE INVENTION

Accordingly, an essential object of the present invention is to provide a lining material, wherein the abrasion amount of the abrasion portion of the lining material is less when the lining material has been slid, the service life is longer, the large noises are not caused in the sliding portion, and an ultrasonic wave driven motor using the lining material.

Another object of the present invention is to provide a superior lining material, wherein the sliding portion does not cause abnormal heating of 350° C. or more when the lining material has been slid, and an ultrasonic wave driven motor using the lining material.

Still another important object of the present invention is to provide a lining material of superior performance, wherein the uneven sliding and rotation is less when the sliding speed of the lining material is lower (0.5 through 5 rpm), the abrasion amount is not increased suddenly even when the sliding speed of the lining material is high (50 through 1000 rpm), and an ultrasonic wave driven motor using the lining material.

A further important object of the present invention is to provide a lining material, wherein the driven torque, the brake torque are large, the motor lock may be prevented, the friction factor is proper, so that so-called stick slip phenomenon is hard to cause, and a supersonic wave driven motor using the lining material.

In accomplishing these and other objects, according to one preferred embodiment of the present invention, the lining material is chiefly composed of meta-type aramid fibrid and meta-type fiber.

More concretely, the lining material of the present invention is composed meta-type aramid fibrid and meta-type aramid fiber of 50% through 100% by weight, polytetrafluoroethylene resin of 0% through 50% by weight, and flake graphite of 0% through 20% by weight, with these members being heated, compressed and molded.

The lining material of the present invention has the percentage of voids of 3% through 40% in the construction.

An ultrasonic wave driven motor using the lining material of the present invention has an excitation portion having vibration component, a stator portion forming a driving face having abrasion-proof and tenacity therein, a rotor portion, wherein an inverted face which is softer than the driving face and has the abrasion-proof property is in contact against the driven face, with a lining material composed of meta-type aramid fibrid meta-type aramid fiber being provided on the inverted face.

More concretely, the ultrasonic wave driven motor using the lining material of the present invention has a lining material, which is composed of meta-type aramid fibrid and meta-type aramid fiber of 50% through 100% by weight, polytetrafluoroethylene resin of 0% through 50% by weight, flake graphite of 0% through 20% by weight provided on the inverted face in the above-described construction, and is heated, compressed, molded.

Furthermore, an ultrasonic wave driven motor using a lining material of the present invention has the lining material voids-percentage of 3% through 40%.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
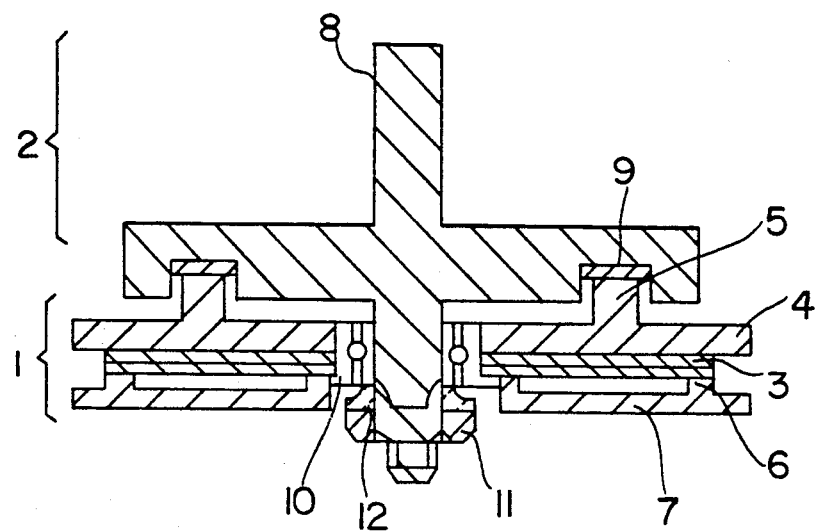
FIG. 1 is a cross-sectional view, showing the construction of an ultrasonic wave driven motor using a lining material in one embodiment of the present invention.

Before the description of the present invention proceeds, it is to be noted that like parts are designated by like reference numerals throughout the accompanying drawings.

Figure 2:
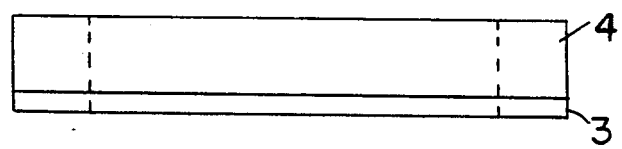
FIG. 2 is a schematic view of a stator portion in the motor.
Figure 3:
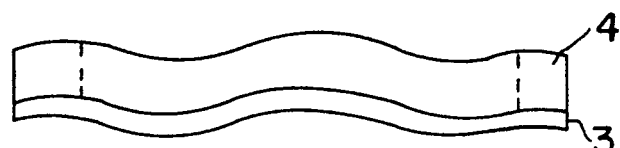
FIG. 3 is an illustrating view showing the vibrating condition of a stator portion in the motor.

Referring now to the drawings, there is shown in FIG. 1, an ultrasonic wave driven motor using a lining material according to one preferred embodiment of the present invention, which is basically composed of a stator portion 1 and a rotor portion that comes into contact against the stator portion 1 and is slidably supported. The stator portion 1 is composed of a piezo-electric member 3 which becomes an exciting portion, and a driving member 4 composed of iron with the piezo-electric member 3 bonded thereon or other metallic material. By the application of +, − electric field respectively upon the adjacent electrodes of the piezo-electric member 3 polarized into N number, the largest ring-shaped deformation portion located in a constant radium portion from the center of the disk at the portion of the piezo-electric member 3 and the driving member 4 glued as shown in FIG. 2 effects wavy vibrations in the whole ring as shown in FIG. 3 to vibrate the vibration amplifying portion 5, which is a projecting portion provided on the largest deformation portion of the driving member 4 so as to drive the rotor portion 2 through the lining material 9 coming into contact against the vibration amplifying portion 5. The ultrasonic wave driven motor using the lining material includes (in FIG. 1) a stator support portion 6, a stator fixing stand 7 having the stator support portion 6, a shaft for a rotor portion 2, a bearing 10 for rotatably supporting the rotor portion 2, a nut 11 engaged with a shaft 8 through a flush spring 12 so as to cause the stator portion 1 to come into contact against the rotor portion 2 with the given contact.

The vibration amplifying portion 5 of the driving member 4 made of iron or the like is vibrated by the application of the voltage upon the piezo-electric member 3 of the stator portion 1. The vibration amplifying portion 5 has an axial and peripheral vibration component, so that each portion of the vibration amplifying portion 5 causes the vibrations describing the elliptical track. At this time, when the lining material 9 provided on the inverted face of the rotor portion 2 is brought into contact against the vibration amplifying portion 5, the rotor portion 2 absorbs the axial component of the vibration and also, rotates in one direction by the peripheral direction component of the vibration. The rotation of the rotor portion 2 is externally drawn out and the motor may be driven as an ultrasonic wave driven motor.

The present invention relates to a lining material to be used for the sliding portion like the inverted face of such an ultrasonic wave driven motor as described hereinabove. The lining material of the present invention is composed of meta-type aramid fibrid and meta-type aramid fiber so that the vibrations (axial vibration component in the ultrasonic wave driven motor having a disk type rotor) in the direction vertical with respect to the sliding direction of the lining material is moderately absorbed, and only the sliding.rotating component by the vibration (vibration component in the peripheral direction in the ultrasonic wave driven motor having a disc-type rotor) in the sliding direction may be effectively drawn out. The compounding ratio of these materials is 50% through 100% by weight in meta-type aramid fibrid and meta-type aramid fiber by weight in polytetrafluoroethylene resin, 0% through 20% by weight in flake graphite.

A preferable method of molding the material of this blending is to uniformly disperse in the water the meta-type aramid (polymethaphenyrenisophthalamide) fibrid and meta type aramid fiber (polymethaphenyrenisophthalamide) polytetrafluoroethylene powder (fluorine resin), flake graphite into a slurry state. The slurry is guided onto wire gauze for dehydration to obtain wet paper. Continuously the wet paper is sufficiently dried within a hot air drying machine. Thereafter, the dried sheets of paper are built up and then are put into a metallic mold. They are heated, compressed, molded under the condition of 100 Kg/cm$^2$ or more, preferably 120 Kg/cm$^2$ through 350 Kg/cm$^2$ at pressure, 150° through 400° C., preferably 200° through 350° C. at molding temperature and are manufactured into board shape. The adjustment of the voids percentage within the board is effected by the compression pressure, thus resulting in the voids percentage of 3% through 40% after the manufacturing operation. The percentage of the voids is converted from the apparent specific gravity.

Better results are obtained when the meta-type aramid fibrid and the meta-type aramid fiber are 2 through 20 μm in thickness, 0.2 through 10 mm in length. Also, the better results are obtained when the polytetrafluoroethylene resin is 1 through 30 μm in granular diameter. The better results are obtained when the flake graphite is 2 through 30 μm in granular diameter.

The molecular formula of the meta-type aramide resin is as follows.

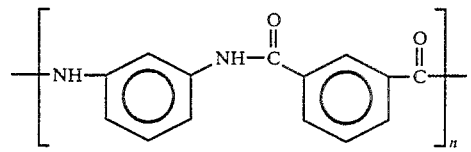

wherein the molecular weight (Mw) is 25,000 through 30,000.

The material compositions of comparison embodiments 1 through 8, embodiments 1 through 18 are shown in Table 3-1, Table 3-2.

The wholly aromatic polyester resin used in the comparison embodiments uses the molecular weight (Mw) 25,000 through 30,000.

It is confirmed that the inverted face of the present invention, i.e., the lining material 9 used in the ultrasonic wave driven motor is superior in abrasion-proof, the friction factor is moderate, with the so-called stick slip phenomenon being hard to cause, furthermore the hardness and bending elasticity factor are moderate and the abrasion-proof is superior.

The friction factors in Table 3-1, Table 3-2 are measured through placement of a 650 g load upon a specimen of 2 cm × 2 cm in plane, movement of the surface of a hardened steel of c in Rockwell hardness, 62 degrees in scale, 2 s in surface roughness at a speed of 5 m per minute. It is built into the ultrasonic wave driven motor, the thickness of the lining material after 500 hours is measured for comparison with the initial one. The abrasion amount of the tables is provided in the above-described way.

The hardness and the bending elasticity factor are provided by a method of measuring a bending elasticity factor in accordance with Japanese Industrial Standard (JIS). In the low speed stability, the rotation unevenness which can be visually recognized is judged X in the existence, absence of the rotation unevenness at 0.5 through 5 rpm. The operation sound is the measured result at the rotation of 50 rpm or more.

The brake torque is one required for the rotor to be rotated while no current flows.

The drive torque is a maximum torque during the energization time. The motor lock characteristics are that the vibration amplifying portion is cut into the lining material to stop the motor when the motor rotation has been stopped through the increase in the friction number during the rotation or the condition has been left as it is for a long time period in a motor stop condition, so that the rotor remains rotationless.

The characteristics of the piezo-electric ceramics of the ultrasonic wave driven motor used in the embodiment are that things shown in Table 1 are used, with the motor using the characteristics shown in Table 2.

Also, in the comparison embodiments, the materials of Table 3-1, Table 3-2 are used for the ultrasonic wave driven motor of the type 3.

Furthermore, Table 4-1 through Table 5-2 show the results of the continuous practical use tests at the constant load corresponding to the type of the respective using motor of the present invention and the comparison embodiments.

In the ultrasonic wave driven motor using for the test, the comparison embodiments 1 through 8 use the type 3 shown in Table 2, the embodiments 1 through 7 through 17 use the type 3 shown in Table 2, the embodiment 18 uses the type 2 shown in Table 2.

TABLE 1

| | | |
|---|---|---|
| 1. Specific Inductive Capacity | $\epsilon_{33}^T/\epsilon_0$ | 1200 |
| 2. Coupling Factor | $K_P$ | 0.58 |
| | $K_{31}$ | 0.35 |
| | $K_{33}$ | 0.69 |
| 3. Young Factor | $Y_{31}^E$ | $8.5 \times 10^{10}$ |
| | $Y_{33}^E$ | $7.0 \times 10^{10}$ |
| 4. Piezoelectric Constant | $d_{31} m/V$ | $-122 \times 10^{-12}$ |
| | $d_{33} m/V$ | $273 \times 10^{-12}$ |
| 5. Piezoelectric Constant | $g_{31} Vm/N$ | $-11.3 \times 10^{-3}$ |
| | $g_{33} Vm/N$ | $25.5 \times 10^{-3}$ |
| 6. Poisson's Ratio | $\sigma^E$ | 0.29 |
| 7. Mechanical Q Value | $Q_m$ | 2000 |

TABLE 2

Characteristics of the Disc type Ultrasonic Wave Driven Motor

| | | | Model | | |
|---|---|---|---|---|---|
| | | | Type-1 | Type-2 | Type-3 |
| Characteristics | Frequency | KHz | 100 | 70 | 50 |
| | Manpower Voltage | $V_{(O-P)}$ | 15 | 30 | 60 |
| | No-load rotation speed | rpm | 700 | 800 | 100 |
| | Drive torque | kg f · cm | 0.08 | 0.8 | 6 |
| | Rotor depressing force | kg f | 0.2 | 2 | 15 |
| Shape | Size   D | mm (φ) | 17 | 40 | 80 |
| | H | mm | 6 | 12 | 23 |
| | Weight | g | 6 | 70 | 400 |

Remarks:
D: Outer diameter of stator portion
H: Height from fixing stand to rotor portion

TABLE 3-1

| | bending elastic modulus kg f/cm² | hardness Rockwell R scale | friction factor (μ) | voids percentage (%) | fibrid & fiber (wt %) | fluorine resin (wt %) | graphite (wt %) |
|---|---|---|---|---|---|---|---|
| comparison embod.-1 | 55000 | 120 | 0.32 | 0 | 0 | 10 | 0 |
| comparison embod.-2 | 35000 | 115 | 0.30 | 0 | 0 | 20 | 0 |
| comparison embod.-3 | 25000 | 100 | 0.28 | 0 | 0 | 30 | 0 |
| comparison embod.-4 | 15000 | 85 | 0.25 | 0 | 0 | 40 | 0 |
| comparison embod.-5 | 10000 | 70 | 0.20 | 0 | 0 | 50 | 0 |
| comparison embod.-6 | 6000 | 60 | 0.18 | 0 | 0 | 60 | 0 |
| comparison embod.-7 | 4000 | 50 | 0.15 | 0 | 0 | 70 | 0 |
| comparison embod.-8 | 2500 | 40 | 0.14 | 0 | 0 | 80 | 0 |
| embod.-1 | 8000 | 40 | 0.35 | 40 | 50 | 50 | 0 |
| embod.-2 | 7500 | 43 | 0.35 | 40 | 50 | 46 | 4 |
| embod.-3 | 6000 | 46 | 0.40 | 35 | 57 | 40 | 3 |
| embod.-4 | 6200 | 45 | 0.40 | 35 | 57 | 35 | 8 |
| embod.-5 | 7500 | 50 | 0.37 | 30 | 60 | 30 | 10 | use the type 1 shown in Table 2, the embodiments 8

TABLE 3-2

| | bending elastic modulus kg f/cm² | hardness Rockwell R scale | friction factor (μ) | voids percentage (%) | fibrid & fiber (wt %) | fluorine resin (wt %) | graphite (wt %) |
|---|---|---|---|---|---|---|---|
| embod.-6 | 7500 | 50 | 0.38 | 30 | 60 | 25 | 15 |
| embod.-7 | 8000 | 55 | 0.35 | 25 | 55 | 25 | 20 |
| embod.-8 | 8000 | 55 | 0.37 | 25 | 60 | 20 | 20 |
| embod.-9 | 10000 | 63 | 0.34 | 20 | 77 | 20 | 3 |
| embod.-10 | 10000 | 62 | 0.36 | 20 | 70 | 20 | 10 |
| embod.-11 | 11000 | 65 | 0.32 | 15 | 82 | 15 | 3 |

TABLE 3-2-continued

| | bending elastic modulus kg f/cm² | hardness Rockwell R scale | friction factor (μ) | voids percentage (%) | fibrid & fiber (wt %) | fluorine resin (wt %) | graphite (wt %) |
|---|---|---|---|---|---|---|---|
| embod.-12 | 10500 | 65 | 0.38 | 15 | 75 | 15 | 10 |
| embod.-13 | 11500 | 67 | 0.33 | 10 | 82 | 15 | 3 |
| embod.-14 | 11700 | 67 | 0.30 | 10 | 80 | 12 | 8 |
| embod.-15 | 16000 | 72 | 0.35 | 5 | 87 | 10 | 3 |
| embod.-16 | 17000 | 72 | 0.33 | 5 | 80 | 13 | 7 |
| embod.-17 | 29000 | 85 | 0.40 | 3 | 95 | 5 | 0 |
| embod.-18 | 30000 | 90 | 0.42 | 3 | 100 | 0 | 0 |

TABLE 4-1

| | Abrasion-proof property (μm) driving face after 500 hours | Abrasion-proof property (μm) inverted face after 500 hours | brake torque gf-cm | drive torque gf-cm | operation noise 20 KHz or lower |
|---|---|---|---|---|---|
| comparison embod.-1 | 22 | 200 | 7500 | 7000 | X |
| comparison embod.-2 | 18 | 150 | 7000 | 6500 | X |
| comparison embod.-3 | 15 | 120 | 6500 | 6000 | X |
| comparison embod.-4 | 12 | 100 | 6000 | 5500 | X |
| comparison embod.-5 | 10 | 80 | 5500 | 5000 | X |
| comparison embod.-6 | 8 | 60 | 5000 | 4500 | X |
| comparison embod.-7 | 5 | 40 | 4500 | 4000 | X |
| comparison embod.-8 | 3 | 20 | 4000 | 3000 | O |
| embod.-1 | 2 | 10 | 6000 | 6000 | O |
| embod.-2 | 2 | 8 | 6300 | 6200 | O |
| embod.-3 | 2 | 11 | 6300 | 6100 | O |
| embod.-4 | 2 | 13 | 6500 | 6200 | O |
| embod.-5 | 2 | 9 | 6300 | 6100 | O |

TABLE 4-2

| | Abrasion-proof property (μm) driving face after 500 hours | Abrasion-proof property (μm) inverted face after 500 hours | brake torque gf-cm | drive torque gf-cm | operation noise 20 KHz or lower |
|---|---|---|---|---|---|
| embod.-6 | 1 | 10 | 6000 | 6000 | O |
| embod.-7 | 2 | 11 | 6300 | 6200 | O |
| embod.-8 | 2 | 11 | 6300 | 6100 | O |
| embod.-9 | 3 | 12 | 6500 | 6200 | O |
| embod.-10 | 2 | 12 | 6300 | 6100 | O |
| embod.-11 | 1 | 9 | 5000 | 4500 | O |
| embod.-12 | 1 | 8 | 4500 | 4000 | O |
| embod.-13 | 2 | 10 | 4000 | 3000 | O |
| embod.-14 | 2 | 12 | 6000 | 6000 | O |
| embod.-15 | 3 | 8 | 6300 | 6200 | O |
| embod.-16 | 3 | 8 | 6300 | 6100 | O |
| embod.-17 | 2 | 10 | 6500 | 6200 | O |
| embod.-18 | 2 | 9 | 6300 | 6100 | O |

TABLE 5-1

| | low speed stability (0.5 through 5 rpm) | motor lock characteristics | practical use |
|---|---|---|---|
| comparison embod.-1 | X | X | X |
| comparison embod.-2 | X | X | X |
| comparison embod.-3 | X | X | X |
| comparison embod.-4 | X | X | X |
| comparison embod.-5 | X | O | X |
| comparison embod.-6 | X | O | X |
| comparison embod.-7 | X | O | X |
| comparison embod.-8 | O | X | X |
| embod.-1 | O | O | O |
| embod.-2 | O | O | O |
| embod.-3 | O | O | O |
| embod.-4 | O | O | O |
| embod.-5 | O | O | O |

TABLE 5-2

|  | low speed stability (0.5 through 5 rpm) | motor lock characteristics | practical use |
| --- | --- | --- | --- |
| embod.-6 | O | O | O |
| embod.-7 | O | O | O |
| embod.-8 | O | O | O |
| embod.-9 | O | O | O |
| embod.-10 | O | O | O |
| embod.-11 | O | O | O |
| embod.-12 | O | O | O |
| embod.-13 | O | O | O |
| embod.-14 | O | O | O |
| embod.-15 | O | O | O |
| embod.-16 | O | O | O |
| embod.-17 | O | O | O |
| embod.-18 | O | O | O |

The depressing force of the rotor effects an optional selection by the composition of the lining of the present invention or the outside diameter and required output of the ultrasonic driven motor. Better results are obtained if the depressing force of the rotor is made stronger when the percentage of voids is large, and if the depressing force of the rotor is made weaker when the percentage of voids is small.

According to the experiment results, meta-type aramid fibrid and meta-type aramid fiber 100% by weight is effective. The effective results are not obtained as the drive torque and the brake torque are small when it is 49% or lower by weight though not described on the table. Polytetrafluoroethylene resin is effective when it is 0% through 50% by weight. The effective results are not obtained as the driven torque and the brake torque are small when it is 51% or higher by weight though not described op the table.

Flake graphite is effective when it is 0% through 20% by weight. The effective results are not obtained as the drive torque and the brake torque are small when it is 21% or higher by weight though not described on the table.

The percentage of voids of 3% through 40% is effective. The effective results are not obtained as the motor lock characteristics are bad when it is 41% or higher though not described on the table. The effective results are not obtained as the sliding sounds are caused during the high speed rotation when it is 3% or less though it is not shown on the table.

In the present embodiment, as described in the example of the disk type ultrasonic wave driven motor, the above-described effects may be provided by the use of the lining material of the present invention even in the ultrasonic wave driven motors of a ring type, a linear type, and the ultrasonic wave driven motors of the other systems.

As is clear from the foregoing description, the present invention may provide a lining material, which is superior in abrasion resistance, moderate in friction factor so that the so-called stick slip phenomenon is hard to cause, and besides, the hardness and the bending elasticity factor are also moderate, the sliding sounds at the high speed are also reduced, because the lining material is composed of meta-type aramid fibrid and meta-type aramid fiber contains polytetrafluoroethylene resin, flake graphite when necessary, so that they are heated, compressed and molded. Also, by the use of the lining material for the ultrasonic wave driven motor, the service life of the ultrasonic wave driven motor may be increased and the noises may be reduced, thus resulting in larger value in the practical use.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A lining material composed of a meta-type aramid fibrid and meta-type aramid fiber as main components.

2. A lining material in accordance with claim 1, wherein the meta-type aramid fibrid and meta-type aramid fiber is present in amounts of 50% through 100% by weight, a polytetrafluoroethylene resin is present in an amount 0% through 50% by weight, and flake graphite is present in amounts of 0% through 20% by weight, with these members being heated, compressed and molded.

3. A lining material in accordance with claim 1, wherein the percentage of voids is 3% through 40%.

4. An ultrasonic wave driven motor comprising a stator portion having an excitation portion having a vibration component and forming a driving face having abrasion-proof properties and tenacity therein, and a rotor portion having an inverted face, softer than the driving face and abrasion-resistant, is brought into contact against the driving face, wherein the lining material which is composed of a meta-type aramid fibrid and a meta-type aramid fiber as main components is provided on the inverted face.

5. An ultrasonic wave driven motor in accordance with claim 4, wherein the lining material is composed of a meta-type aramid fibrid and a meta-type aramid fiber present in an amount of 50% through 100% by weight, polytetrafluoroethylene resin present in an amount of 0% through 50% by weight, and flake graphite in an amount of 0% through 20% by weight, with these members being heated, compressed and molded.

6. An ultrasonic wave driven motor in accordance with claim 5, wherein the voids percentage of the lining material is 3% through 40%.

* * * * *